Figure 1:
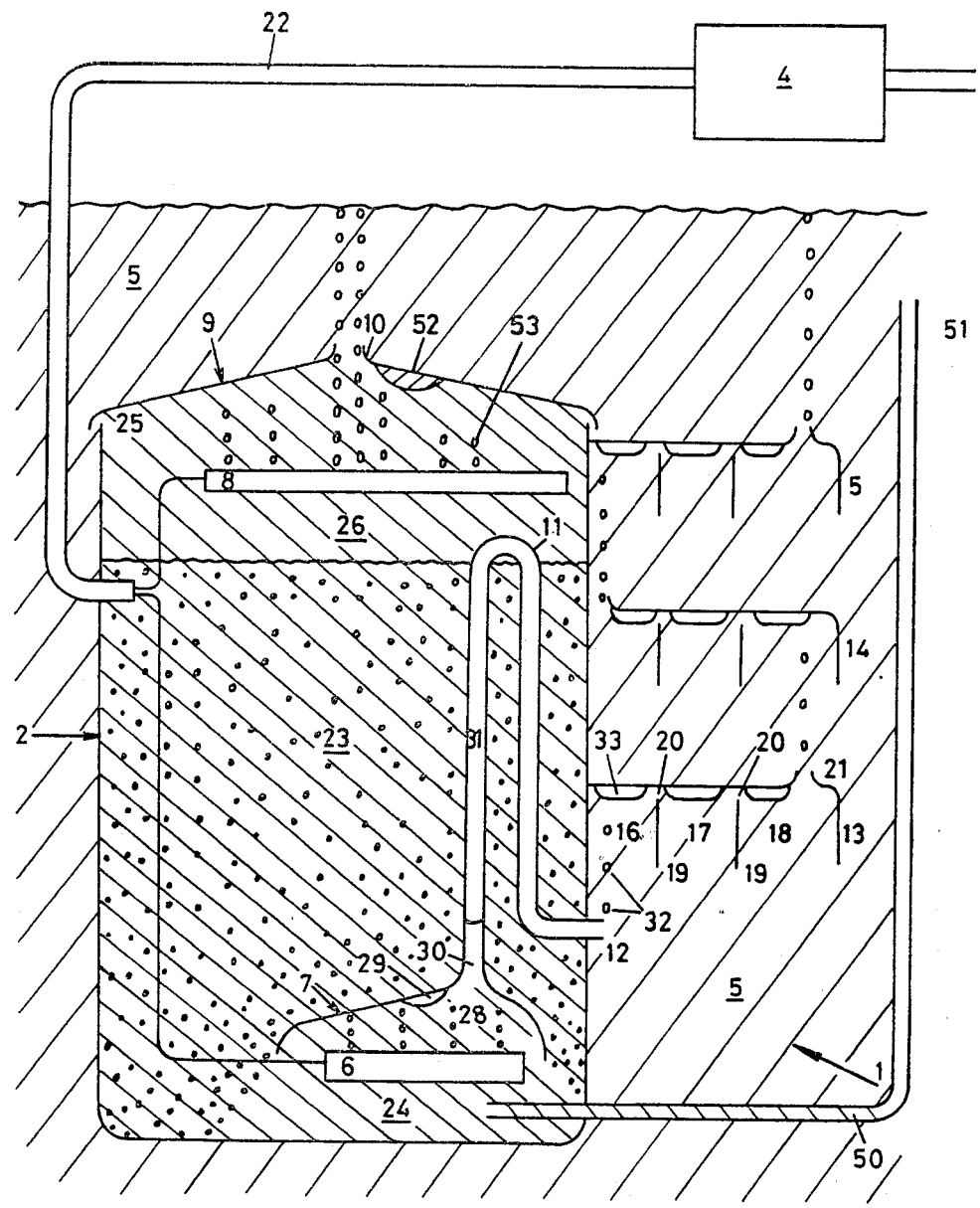

United States Patent [19]

Bindon

[11] 4,419,207

[45] * Dec. 6, 1983

[54] ELECTROLYTIC HALOGEN GENERATORS

[76] Inventor: Jeffrey P. Bindon, 11 Edinburgh Crescent, Westville, 3630, Natal, South Africa

[*] Notice: The portion of the term of this patent subsequent to Feb. 14, 1999 has been disclaimed.

[21] Appl. No.: 385,800

[22] Filed: Jun. 7, 1982

[30] Foreign Application Priority Data

Jun. 8, 1981 [ZA] South Africa ............... 81/3816

[51] Int. Cl.³ .................... C25B 9/00; C25B 1/34; C25B 15/08
[52] U.S. Cl. ................... 204/237; 204/266; 204/278
[58] Field of Search ............ 204/275, 278, 271, 270, 204/266, 237, 277

[56] References Cited

U.S. PATENT DOCUMENTS

| 491,700 | 2/1893 | Cutten | 204/266 X |
|---|---|---|---|
| 807,640 | 12/1905 | Roberts | 204/266 X |
| 3,129,162 | 4/1968 | Jones | 204/278 |
| 3,274,094 | 9/1966 | Klein | 204/275 |
| 3,379,626 | 4/1968 | Heuse et al. | 204/237 X |
| 4,097,356 | 6/1978 | Yates | 204/266 X |
| 4,248,715 | 2/1981 | Olivier | 204/266 X |
| 4,260,468 | 4/1981 | Bradley | 204/266 X |
| 4,290,873 | 9/1981 | Weaver | 204/271 |
| 4,363,713 | 12/1982 | Bindon | 204/278 |

Primary Examiner—Charles F. Warren
Assistant Examiner—Gerard P. Rooney

[57] ABSTRACT

The invention concerns a halogen generator submersible in water, the anode and cathode being separated by a salt bed, the chlorine generated at the anode being collected and conducted to the surrounding water via a collecting hood so that the chlorine does not mix with the catholyte or salt bed, the hydrogen formed at the cathode being released through an opening in the generator in the form of large bubbles to promote the flow of water in a tube from a point in the water above the generator to an inlet adjacent the anode whereby there is constituted a flow from anode to cathode to prevent caustic soda migration towards the anode.

6 Claims, 3 Drawing Figures

ELECTROLYTIC HALOGEN GENERATORS

This invention is an improvement in or modification of the invention described in U.S. patent application No. 226,512 filed Jan. 19, 1981, now U.S. Pat. No. 4,363,713.

In that application an electrolytic chlorine generator submersible in water, is described in which the cathode and anode of the electrolytic generator are placed respectively above and below a salt bed. The density of the stabilised layer of saline liquid within the salt bed and the ventilating action of hydrogen bubbles discharging through a vent hole or discharge aperture prevents most of the caustic soda formed at the cathode from moving down towards the anode where it would prevent the further production of chlorine.

Some caustic soda, however, is drawn towards the anode and this may, after time, result in a build-up of caustic soda in the region of the anode and affect the production of chlorine.

The improvement provided by this invention relates to a method of preventing this caustic soda movement by the provision of a counter-flow in the liquid so that virtually no caustic soda reaches the anode with the result that the chlorine production may contine until substantially all the salt is consumed.

U.S. Pat. No. 491,700 to Cutten shows the use of a counter-flow of fresh brine moving upwardly against a downward caustic soda flow. However, as a result of the arrangement of the generator components, particularly the vertical cathode and anode, the fresh brine outlet is situated at the point of highest caustic soda concentration. This inevitably results in the entrainment of caustic soda with the brine washing the anode whereby the efficiency of the generator is impaired.

A second beneficial result of the improvement is found in the fact that since the electrolyte within the salt bed and around the anode is virtually purged of caustic soda, this electrolyte need not be discharged periodically when the cell is refilled with salt.

According to the invention a submersible electrolytic halogen generator comprising a cell which includes a cathode adapted for location above a halide bed and an anode adapted for location therebelow, the cell being formed with a discharge aperture, at a high point, for the gaseous product formed at the cathode is characterised in that means is provided which is associated with the discharge aperture to promote a liquid flow in the electrolyte in a direction substantially from the anode to the cathode.

In the preferred form of the invention the liquid flow promotion means comprises an inlet formed in a zone of the cell which, in use, contains a large proportion of anolyte, the inlet being provided with an inlet tube extending from a point outside the cell which is higher than the level of the discharge aperture. The reason for this is that, if lower than that the electrolyte, which has a higher specific gravity than the water surrounding the cell, may drain out and in fact reverse the flow.

The inlet is preferably directly below the anode to ensure that the flow sweeps past the anode.

The efficacy of the device may be increased by the provision of means adapted to accumulate the gaseous product formed at the cathode and periodically to discharge the accumulated gas through the discharge aperture instead of discharging the gaseous product as a continuous stream of bubbles. In this manner, with larger volumes of gas being discharged simultaneously, more liquid is drawn through the inlet than would have been the case had the discharge been gradual as has been done in the past. In addition, a more effective counter-flow is set in motion to act against the flow of electrolyte from the cathode to the anode.

The accumulator means is preferably a dome or merely a horizontal area located adjacent the discharge aperture. A horizontal area formed in the lid of the cell adjacent the discharge aperture is sufficient to trap and accumulate the bubbles prior to their simultaneous discharge, as the surface tension of the liquid holds the bubble together much in the manner of an inverse meniscus until the buoyancy thereof overcomes the surface tension and the bubble starts flowing to the discharge aperture. When this happens, substantially the whole of the bubble is discharged, once again as a result of surface tension holding the bubble together.

Figure 2:
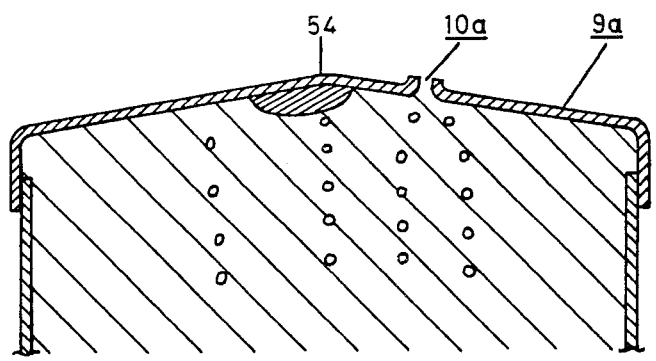
Figure 3:
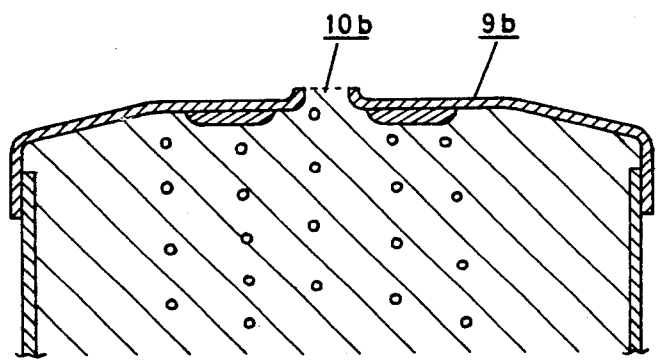

The invention is further described with reference to the accompanying drawings in which:

FIG. 1 is a diagrammatic section of a cell of a halogen generator described in the above-mentioned co-pending application modified according to this invention; and FIGS. 2 and 3 are modified lids or roofs for the cell which are shown in cross section.

In FIG. 1 a chlorine generator 1 is shown submerged beneath the surface of a swimming pool, the generator comprising two major components: an electrolytic cell 2 and a transformer/rectifier unit (indicated generally by a box 4). The electrolytic cell 2 has an anode 6 located near the base of the cell and an anode hood 7 is provided thereover. A cathode 8 is located near the top of the cell, which is closed by means of a lid 9 in which an aperture 10 is formed. An inverted U-shaped conduit 11 leads from the top of the anode hood 7 to the water 5 surrounding the cell 2. A stack of dissolvers 13,14,15 are located on the outside of the cell, the lower faces of the dissolvers being provided into a number of compartments 16,17,18 by partitions 19 which are provided with holes near their point of attachment to the under surface of the dissolvers. A cable 22 provides power to the anode and the cathode.

Prior to the location of the cell in the water, the lid 9 thereof is removed and a bed of granular table salt 23 is fed in to a level just below the cathode 8. Water is then poured in completely to fill the cell 2, forming a saline anolyte 24 near the anode 6 and a dilute saline catholyte 25,26 in the region of the cathode. The lid 9 is replaced and the cell is lowered into the water 5, any trapped air escaping through the hole 10 in the lid. The power supply 4 is then switched on.

At the cathode 8 hydrogen gas 27 and caustic soda are formed, the hydrogen bubbles rising upwards and mixing and diluting the caustic soda into the catholyte 25 above the cathode 8. The action of the bubbles 27 divides the catholyte 25,26 into distinct regions, a dense stagnant layer 26 between the cathode 8 and the salt bed 23 and a dilute turbulent layer 25 between the cathode and the lid 9.

The downward migration of the caustic catholyte 25 towards the anode 6 by mixing or convection is retarded by the stagnant layer of catholyte 26 between the cathode 8 and the salt bed 23, by the stagnant electrolyte within the salt bed 23 and by the physical distance of the cathode 8 from the anode 6. The catholyte 26 is stagnant because the liquid layers in contact with the salt bed 23 are heavier than the light liquid in contact with the dilute catholyte 25. It is the applicant's experience that the degree of stagnancy is such as to cause no salt from the salt bed to dissolve into the dilute catholyte 25 despite the turbulence caused by the action of the hydrogen bubbles 27.

Gas 28, consisting of chlorine and traces of oxygen, is formed on the anode 6 by electrolysis and rises upwards, accumulating in bubbles 29 beneath the anode hood 7. The anode hood 7 prevents the gas 28 from bubbling up through the salt bed. In this manner the dangerous contamination of the salt bed and the electrolyte with chlorine is prevented as well as the dissolution of the salt bed 23 into the dilute electrolyte 25 and hence into the water 5 via the hole 10. It also prevents the mixing of the caustic catholyte 25,26 with the anolyte 24.

The accumulated gas under the anode hood 7 moves, via the "U-tube" to the water and, in negotiating the "U-tube", the back pressure of the escaping gas prevents the passage of anolyte 24 into the water 5. The escaping gas 32 is caught beneath the first dissolver 13, forming a large flat bubble 33. Some chlorine will dissolve into the water and the remaining gas, now partially depleted of chlorine, will pass through the connecting hole 20 in the partition 19 to enter the second compartment 17. Chlorine will continue to dissolve as the gas passes from compartment to compartment until it reaches the last compartment 18 from whence it passes via the hole 21 to the next dissolver 14 where the process is repeated. From there it passes to the upper dissolver 15 and from here the gas, almost totally devoid of chlorine is expelled into the water.

The improvement or modification provided by the present invention is concerned with a tube 50 leading from a point below the anode 6 of a chlorine generator 1 to a point 51 slightly above the cell. The end of the tube 51 is still submerged beneath the water 5 which surrounds the cell 1. As the hydrogen formed at the cathode rises from the cathode, the lid 9 which is modified in a manner described below, traps the bubbles 53 rising from the cathode or at least a substantial portion of the bubbles 53.

The bubbles, in trying to escape, accumulate in a large bubble 52, which, when large enough, is suddenly discharged through the discharge aperture or vent hole 10 in the lid 9.

The shape of the lid can be seen in greater detail in FIGS. 2 and 3, the lid 9a shown in FIG. 2 being formed with a dome or an apex 54 and in which the discharge aperture 10a is off-set with respect to the apex 54. A substantial amount of the hydrogen bubbles will be trapped beneath the apex 54 prior to their discharge as a large bubble.

An even simpler lid 9b is shown in FIG. 3 to include merely a horizontal area adjacent the discharge aperture 10b which serves, in the manner of the apex 54, as an accumulator for the gas bubbles.

When this large bubble is suddenly discharged, liquid from the outside of the cell will move into the cell to replace the volume previously occupied by the bubble. No doubt some of this liquid will enter via the tube 50 while some will enter via the vent hole 10 at the same time as the bubble 52 is ejected. However, with a large bubble, the whole of the vent 10 is occupied by the bubble for a substantial part of the time that it takes for the bubble to exit. During this time, while the gas is moving out of the cell, it is being replaced by liquid from the inlet tube 50. With small bubbles, on the other hand, the bubbles passing out of the hole 10 do not occupy and seal off the entire vent hole 10. Therefore the liquid is fairly free to move in through the vent hole simultaneously with the movement of a bubble out of the vent hole.

The liquid entering via the inlet tube 50 causes a small flow of liquid upwards towards the cathode 8 and this flow of liquid counters the flow of catholyte or caustic soda towards the anode 6.

It will be appreciated that this liquid flow or counter current, can be controlled by the design of the lid shape as is shown in FIGS. 2 and 3 and also by the size of the vent hole 10 exactly to counteract the flow of caustic soda towards the anode 6. Chlorine production will thus continue until substantially all of the salt is finished or partially consumed. At this point the electrolyte within the salt bed 23 and in the area 24 around the anode 6 is not caustic but pure salt water.

When fresh salt is recharged from the top of the cell after removal of the lid 9, no caustic soda is trapped within the salt bed to prevent chlorine production on the one hand or to pose a health hazard on the other hand.

The electrolyte need therefore not be discharged at the time the salt is replenished and the recharging process is simplified as the cell need not be detached from its mounting and tipped over.

It will be appreciated that the tube 50,51 may be located within the confines of the apparatus.

It will also be appreciated that tube 50 may terminate at any zone below the anode hood 7.

I claim:

1. An electrolytic halogen generator comprising a cell which is submersible in a liquid and which includes a cathode adapted for location above a halide bed and an anode adapted for location therebelow, the cell being formed with a discharge aperture, at a high point, for the gaseous product formed at the cathode, is characterised in that inlet means is provided, which, in combination with the discharge of the cathode products through the discharge aperture, is adapted to promote a liquid flow in the electrolyte in a direction from the anode to the cathode.

2. A halogen generator according to claim 1, in which the flow promotion means comprises an open-ended conduit extending from a point outside the cell to a zone inside the cell which, in use, contains a large proportion of anolyte, the conduit terminating, outside the cell, at a point higher than the level of the discharge aperture.

3. A halogen generator according to claim 1 in which the flow promotion means comprises an open-ended conduit extending from a point outside the cell to an area inside the cell which, in use contains a large proportion of anolyte, the conduit terminating, outside the cell, at a point higher than the level of the discharge aperture and in which the conduit terminates, inside the cell, directly below the anode.

4. A halogen generator according to claim 1 which includes means adapted to accumulate the gaseous product formed at the cathode and periodically to discharge at least a portion of the accumulated gas through the discharge aperture.

5. A halogen generator according to claim 1 which includes means adapted to accumulate the gaseous product formed at the cathode and periodically to discharge at least a portion of the accumulated gas through the discharge aperture in which the accumulator means is a dome located adjacent the discharge aperture.

6. A halogen generator according to claim 1 in which the flow promotion means comprises an open-ended conduit extending from a point outside the cell to an area inside the cell which, in use contains a large proportion of anolyte, the conduit terminating, outside the cell, at a point higher than the level of the discharge aperture and in which the conduit terminates, inside the cell, directly below the anode, and which includes means adapted to accumulate the gaseous product formed at the cathode and periodically to discharge at least a portion of the accumulated gas through the discharge aperture in which the accumulator means is a dome located adjacent the discharge aperture.

* * * * *